United States Patent
Jung et al.

(10) Patent No.: US 10,809,432 B2
(45) Date of Patent: Oct. 20, 2020

(54) POLARIZING PLATE AND OPTICAL DISPLAY COMPRISING THE SAME

(71) Applicant: Samsung SDI Co., Ltd., Yongin-si, Gyeonggi-do (KR)

(72) Inventors: Yeon Ju Jung, Suwon-si (KR); Seo Young Kang, Suwon-si (KR); Han Su Kim, Suwon-si (KR); Il Woong Baek, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 111 days.

(21) Appl. No.: 16/232,999

(22) Filed: Dec. 26, 2018

(65) Prior Publication Data
US 2019/0204485 A1    Jul. 4, 2019

(30) Foreign Application Priority Data
Dec. 28, 2017    (KR) .......................... 10-2017-0183240

(51) Int. Cl.
*G02B 5/30* (2006.01)
*G02B 1/111* (2015.01)
*G02B 1/14* (2015.01)

(52) U.S. Cl.
CPC .............. *G02B 5/305* (2013.01); *G02B 1/111* (2013.01); *G02B 5/3033* (2013.01); *G02B 1/14* (2015.01)

(58) Field of Classification Search
CPC ...... G02B 5/305; G02B 5/3033; G02B 1/111; G02B 1/14
See application file for complete search history.

(56) References Cited

U.S. PATENT DOCUMENTS

2015/0301231 A1* 10/2015 Yang ...................... G02B 1/111
428/313.9

FOREIGN PATENT DOCUMENTS

| JP | 2007-062101 A | 3/2007 |
| KR | 10-2011-0126921 | 11/2011 |
| KR | 2014-0065250 A | 5/2014 |
| KR | 2015-0114149 A | 10/2015 |

(Continued)

OTHER PUBLICATIONS

Kazumasa Inata, et. al., "Photocurable adhesive composition, polarizer and process for producing the same, optical member and liquid crystal display device", TW201531805A, machine translation. (Year: 2015).*

(Continued)

*Primary Examiner* — Wen Huang
(74) *Attorney, Agent, or Firm* — Lewis Roca Rothgerber Christie LLP

(57) ABSTRACT

A polarizing plate and an optical display including the same are provided. A polarizing plate includes: a polarizer; a bonding layer on an upper surface of the polarizer; and an anti-reflection film on an upper surface of the bonding layer, and the anti-reflection film includes a base layer, a high refractivity layer, and a low refractivity layer sequentially stacked on the bonding layer in the stated order, the bonding layer has an index of refraction of about 1.51 to less than 1.60, and the polarizer, the bonding layer, and the base layer satisfy the relation: Index of refraction of polarizer<Index of refraction of bonding layer<Index of refraction of base layer.

20 Claims, 2 Drawing Sheets

(56) References Cited

FOREIGN PATENT DOCUMENTS

| KR | 2016-0117722 A | 10/2016 |
|----|----------------|---------|
| TW | 2015-31805 A   | 8/2015  |
| TW | 2016-07734 A   | 3/2016  |

OTHER PUBLICATIONS

Taiwan Office Action in corresponding Taiwan Application No. 107146880, Taiwan Office Action dated Mar. 10, 2020 (7 pgs.).

* cited by examiner

POLARIZING PLATE AND OPTICAL DISPLAY COMPRISING THE SAME

CROSS-REFERENCE TO RELATED APPLICATION

This application claims priority to and the benefit of Korean Patent Application No. 10-2017-0183240, filed on Dec. 28, 2017 in the Korean Intellectual Property Office, the entire disclosures of which are incorporated herein by reference.

BACKGROUND

1. Field

Aspects of embodiments of the present invention relate to a polarizing plate and an optical display including the same.

2. Description of the Related Art

In operation of an optical display, there is a problem of an unclear screen due to reflection of external light or interior lighting on the screen. In order to solve such a problem, a coating layer is formed on the outermost surface of the optical display. A representative example of the coating layer is an anti-glare (AG) coating layer or an anti-reflection (AR) coating layer. The AR coating layer suppresses reflection by offsetting light based on difference in index of refraction between the coating layer and other layers. A lower reflectivity provides better screen quality by more efficiently suppressing reflection of light during operation of the optical display.

In general, reflectivity of the coating layer is reduced by changing indices of refraction or thicknesses of resins for a high refractivity layer and a low refractivity layer constituting the AR coating layer. Since reflectivity relates to the index of refraction of the coating layer, reflectivity of the coating layer is generally reduced by adjusting the indices of refraction of the high refractivity layer and the low refractivity layer. However, when a film having a high index of refraction, for example, a polyethylene terephthalate (PET) film, is used as a base layer of the AR coating layer, there is a limitation in reduction in reflectivity even by reducing the index of refraction of the low refractivity layer. In particular, when an AR coating layer formed of a film having a high index of refraction as the base layer is applied to a polarizing plate, it is difficult to reduce reflectivity of the polarizing plate below 0.4%.

The background technique of the present invention is disclosed in Korean Patent Laid-open Publication No. 2011-0126921 and the like.

SUMMARY

According to an aspect of embodiments of the present invention, a polarizing plate includes an anti-reflection film including a base layer having a high index of refraction and low reflectivity.

According to another aspect of embodiments of the present invention, a polarizing plate is reduced in reflectivity to 0.4% or less to improve screen quality of an optical display.

According to another aspect of embodiments of the present invention, an optical display includes a polarizing plate according to the present invention. In accordance with one or more embodiments of the present invention, a polarizing plate includes: a polarizer; a bonding layer on an upper surface of the polarizer; and an anti-reflection film on an upper surface of the bonding layer, wherein the anti-reflection film includes a base layer, a high refractivity layer, and a low refractivity layer sequentially stacked on the bonding layer in the stated order, the bonding layer has an index of refraction of about 1.51 to less than 1.60, and the polarizer, the bonding layer, and the base layer satisfy the following Relation 1: Index of refraction of polarizer<Index of refraction of bonding layer<Index of refraction of base layer.

In an embodiment, the anti-reflection film may have a reflectivity of about 0.3% or less.

In an embodiment, the base layer may have a higher index of refraction than the low refractivity layer, and a difference in index of refraction between the base layer and the low refractivity layer may be about 0.25 or more.

In an embodiment, the base layer may have an index of refraction of about 1.60 or more.

In an embodiment, the base layer may include a film formed of at least one of polyethylene terephthalate, polybutylene terephthalate, polyethylene naphthalate, and polybutylene naphthalate.

In an embodiment, the high refractivity layer may have an index of refraction of about 1.65 or more.

In an embodiment, the low refractivity layer may have an index of refraction of less than about 1.65.

In an embodiment, the bonding layer may be formed of a bonding layer composition including an epoxy compound and an initiator.

In an embodiment, the bonding layer composition may further include at least one of a (meth)acrylate compound and an oxetane compound.

In an embodiment, the bonding layer may be formed of a bonding layer composition including about 50% by weight (wt %) to about 80 wt % of an alicyclic epoxy compound, about 1 wt % to about 20 wt % of an aromatic epoxy compound, about 1 wt % to about 20 wt % of a (meth)acrylate compound having at least one hydrophilic group, about 1 wt % to about 20 wt % of a (meth)acrylate compound having no hydrophilic group, and about 1 wt % to about 10 wt % of an initiator in terms of solid content.

In an embodiment, the bonding layer may be formed of a bonding layer composition including about 30 wt % to about 70 wt % of an aromatic epoxy compound, about 10 wt % to about 50 wt % of a linear aliphatic epoxy compound, about 10 wt % to about 40 wt % of an oxetane compound, and about 1 wt % to about 10 wt % of an initiator in terms of solid content.

In an embodiment, the polarizer may have an index of refraction of about 1.3 to about 1.5; the bonding layer may have an index of refraction of about 1.51 to about 1.59; the base layer may have an index of refraction of about 1.60 to about 1.75; the high refractivity layer may have an index of refraction of about 1.65 to about 1.80; and the low refractivity layer may have an index of refraction of about 1.1 to about 1.5.

In an embodiment, the polarizing plate may further include a hard coating layer between the base layer and the high refractivity layer.

In an embodiment, the anti-reflection film may have a reflectivity of about 0.3% or less.

In an embodiment, the base layer may have a higher index of refraction than the hard coating layer, and a difference in index of refraction between the base layer and the hard coating layer may be about 0.05 or more.

In an embodiment, the polarizer may have an index of refraction of about 1.3 to about 1.5; the bonding layer may have an index of refraction of about 1.51 to about 1.59; the base layer may have an index of refraction of about 1.60 to about 1.75; the hard coating layer may have an index of refraction of about 1.50 to about 1.599; the high refractivity layer may have an index of refraction of about 1.65 to about 1.80; and the low refractivity layer may have an index of refraction of about 1.1 to about 1.5.

In an embodiment, the polarizing plate may further include a support layer between the base layer and the high refractivity layer.

In an embodiment, the polarizing plate may further include a polarizer protective film on a lower surface of the polarizer.

In an embodiment, the polarizing plate may have a reflectivity of about 0.4% or less as measured at a side of the low refractivity layer.

In accordance with one or more embodiments of the present invention, an optical display includes the polarizing plate according to the present invention.

According to one or more embodiments of the present invention, a polarizing plate that includes an anti-reflection film including a base layer having a high index of refraction and low reflectivity is provided.

According to one or more embodiments of the present invention, a polarizing plate that is reduced in reflectivity to 0.4% or less to improve screen quality of an optical display is provided.

According to one or more embodiments of the present invention, an optical display that includes the polarizing plate according to the present invention is provided.

DETAILED DESCRIPTION

Figure 1:
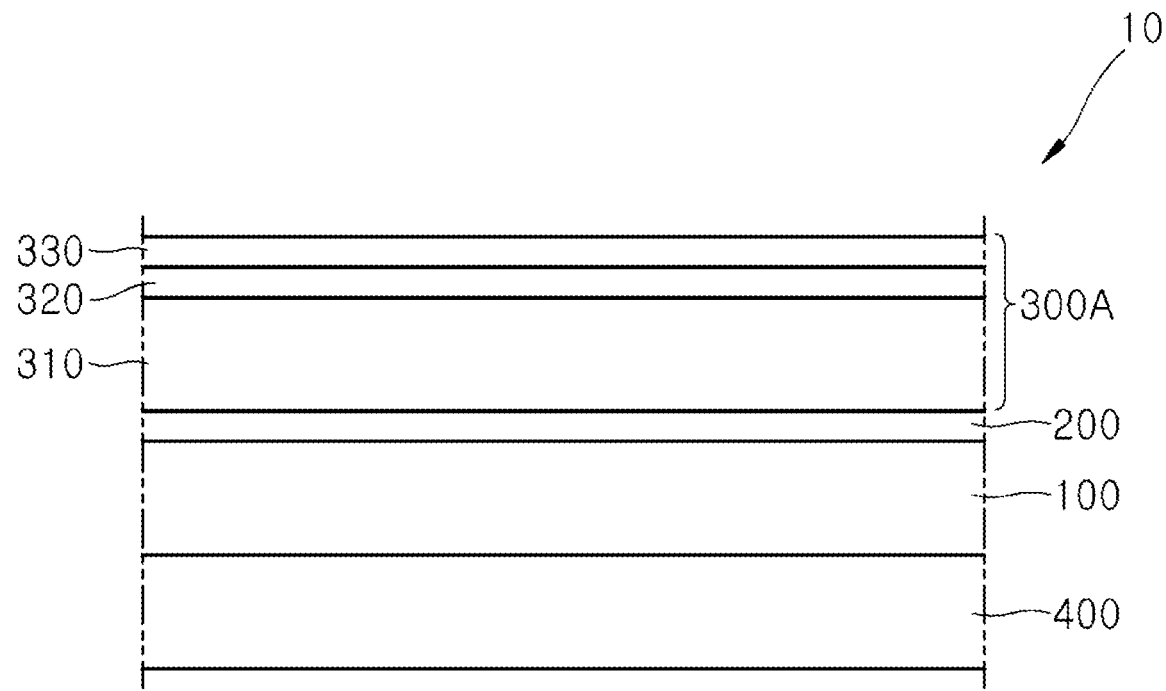
FIG. 1 is a cross-sectional view of a polarizing plate according to an embodiment of the present invention.

Some embodiments of the present invention will be described in further detail with reference to the accompanying drawings to provide a thorough understanding of the invention to those skilled in the art. It is to be understood that the present invention may be embodied in different ways and is not limited to the following embodiments. In the drawings, portions irrelevant to the description may be omitted for clarity. Like components are denoted by like reference numerals throughout the specification.

Herein, spatially relative terms such as "upper" and "lower" are defined with reference to the accompanying drawings. Thus, it is to be understood that the term "upper surface" can be used interchangeably with the term "lower surface."

Herein, "in-plane retardation (Re)" is measured at a wavelength of 550 nm and is represented by Equation 2:

$$Re = (nx - ny) \times d \qquad (2),$$

wherein nx and ny are indices of refraction in the x-axis and y-axis directions of a protective film (or base layer) at a wavelength of 550 nm, respectively, and d is a thickness of the protective film (or base layer) (unit: nm).

Herein, a polarizing plate according to an embodiment of the present invention will be described with reference to FIG. 1.

Referring to FIG. 1, a polarizing plate 10 includes a polarizer 100; a polarizer protective film 400 stacked on a lower surface of the polarizer 100; and a bonding layer 200 and an anti-reflection film 300A sequentially stacked on an upper surface of the polarizer 100.

A base layer 310 of the anti-reflection film 300A has a higher index of refraction than a low refractivity layer 330 of the anti-reflection film 300A, and a difference in index of refraction between the base layer 310 and the low refractivity layer 330 may be about 0.25 or more, for example, about 0.25 to about 0.50. According to embodiments of the present invention, the bonding layer 200 serves to bond the anti-reflection film 300A to the polarizer 100 and is formed to have an index of refraction of about 1.51 to less than about 1.60, and the indices of refraction of the polarizer 100, the bonding layer 200, and the base layer 310 satisfy Relation 1, thereby enabling substantial reduction in reflectivity of the polarizing plate to about 0.4% or less, as measured at a side of the low refractivity layer 330.

According to embodiments of the present invention, the following Relation 1 is satisfied: Index of refraction of polarizer<Index of refraction of bonding layer<Index of refraction of base layer.

The polarizing plate 10 according to the present invention includes the base layer 310, in which a difference in index of refraction between the base layer 310 and the low refractivity layer 330 is about 0.25 or more, and the index of refraction of the bonding layer 200 is about 1.51 to less than about 1.60 while satisfying Relation 1, thereby enabling significant reduction in reflectivity of the polarizing plate 10, despite the presence of the anti-reflection film 300A.

Next, each of components of the polarizing plate 10 according to an embodiment of the present invention will be described.

The anti-reflection film 300A may be stacked on a light exit surface of the polarizer 100 via the bonding layer 200. The anti-reflection film 300A may include the base layer 310, a high refractivity layer 320, and a low refractivity layer 330 sequentially stacked on the bonding layer 200 in the stated order. The anti-reflection film 300A may prevent or substantially prevent glare by preventing or substantially preventing reflection of external light using the high refractivity layer 320 and the low refractivity layer 330.

The anti-reflection film 300A may have a reflectivity of about 0.30% or less, for example, about 0.15% to about 0.25%. Within this range, the anti-reflection film 300A can provide good external appearance by preventing or substantially preventing color dispersion when external light is incident thereon.

In an embodiment, the anti-reflection film 300A may have a thickness of about 20 μm to about 150 μm, for example, about 50 μm to about 120 μm, or, for example, about 50 μm to about 100 μm. Within this thickness range, the anti-reflection film 300A can be used in the polarizing plate 10.

The base layer 310 supports the anti-reflection film 300A while improving mechanical strength of the anti-reflection film 300A.

The base layer 310 may include a protective film having an index of refraction of about 1.60 or more, for example, about 1.60 to about 1.75. In the structure in which the base layer 310 having an index of refraction within this range is formed between the bonding layer 200 having an index of refraction within the above range and the stack of the high refractivity layer 320 and the low refractivity layer 330, the polarizing plate 10 may have a low reflectivity of about 0.4% or less, as measured at a side of the low refractivity layer 330.

The base layer 310 may include a film formed of an optically transparent resin and having an index of refraction within the above range before or after elongation. For example, the resin may include a polyester resin, such as any of polyethylene terephthalate, polybutylene terephthalate, polyethylene naphthalate, polybutylene naphthalate, and the like.

Although the base layer 310 may be a non-stretched film, the base layer 310 may be stretched to provide a retardation within a certain range (e.g., a predetermined range), thereby providing additional optical effects to the polarizing plate 10.

In an embodiment, the base layer 310 may have an in-plane retardation Re of about 5,000 nm or more, and, in an embodiment, about 5,000 nm to about 12,000 nm, at a wavelength of 550 nm. Within this range, the base layer 310 formed of a polyester film can suppress rainbow mura.

In another embodiment, the base layer 310 may be an isotropic optical film having an in-plane retardation Re of less than about 5,000 nm, for example, about 60 nm or less, or about 0 nm to about 60 nm, and, in an embodiment, about 40 nm to about 60 nm, at a wavelength of 550 nm. Within this range, the base layer 310 can improve image quality by compensating for viewing angle. Herein, the term "isotropic optical film" means a film having substantially the same nx, ny, and nz, and the expression "substantially the same" includes not only the case in which nx, ny, and nz are the same, but also the case in which there is an acceptable margin of error between nx, ny, and nz.

The base layer 310 may be a uniaxially stretched film or a biaxially stretched film. In an embodiment, the uniaxially stretched film may be a TD uniaxially stretched film and may have an in-plane retardation within the above range. The uniaxially stretched film is subjected to tension relaxation after TD uniaxial stretching, thereby preventing or substantially preventing film shrinkage even after TD stretching at high magnification. Tension relaxation may include a process of treating the stretched film in a certain range (e.g., a predetermined range) of temperature without additional TD stretching. When the base layer 310 is the TD uniaxially stretched film, the index of refraction of the base layer 310 means the index of refraction of the base layer 310 in the MD.

The base layer 310 may have a light transmittance of about 80% or more, and, in an embodiment, about 85% to about 95%, in the visible range. Within this range, the base layer 310 can be used in the polarizing plate 10.

The base layer 310 may include a base film and a primer layer formed on at least one surface of the base film. A ratio of the index of refraction of the primer layer to the index of refraction of the base film (index of refraction of the primer layer/index of refraction of the base layer) may be about 1.0 or less, and, in an embodiment, about 0.6 to about 1.0, and, in an embodiment, about 0.69 to about 0.95, and, in an embodiment, about 0.7 to about 0.9, and, in an embodiment, about 0.72 to about 0.88. Within this range, the base layer can have improved light transmittance. The base film may have an index of refraction of about 1.3 to about 1.7, and, in an embodiment, about 1.4 to about 1.6. Within this range, the base film may be used in the base layer, allows easy control of the index of refraction with the primer layer, and can improve transmittance of the base layer 310. The base film may include a film formed of the resin described above. The primer layer may have an index of refraction of about 1.0 to about 1.6, and, in an embodiment, about 1.1 to about 1.6, and, in an embodiment, about 1.1 to about 1.5. Within this range, the primer layer can have a suitable index of refraction with respect to the base film, thereby improving transmittance of the base layer 310. The primer layer may have a thickness of about 1 nm to about 200 nm, and, in an embodiment, about 60 nm to about 200 nm. Within this range, the primer layer may be used in an optical film and can have a suitable index of refraction with respect to the base film, thereby improving transmittance of the base layer 310 without embrittlement of the base layer 310. The primer layer may be a non-urethane based primer layer free from a urethane group. In an embodiment, the primer layer may be formed of a primer layer composition including a resin, such as a polyester resin, an acrylic resin, and the like, or monomers thereof. By adjusting the mixed ratio of monomers (for example: mole ratio), the primer layer can have the index of refraction within the above range. The primer layer composition may further include at least one additive selected from among a UV absorbent, an antistatic agent, a defoamer, a surfactant, and the like.

For the base layer 310, one of the index of refraction in the x-axis direction, that is, nx, and the index of refraction in the y-axis direction, that is, ny, at a wavelength of 550 nm may be about 1.65 or more. If both nx and ny of the base layer 310 are less than about 1.65 or if both nx and ny of the base layer 310 are about 1.65 or more, rainbow spots can be generated by birefringence caused by variation in retardation depending on incident angle and wavelength when the base layer 310 is used as a protective film. In one embodiment, the base layer 310 may have an nx of about 1.65 or more, and, in an embodiment, about 1.67 to about 1.75, and an ny of about 1.45 to about 1.55. In another embodiment, the base layer 310 may have an ny of about 1.65 or more, and, in an embodiment, about 1.67 to about 1.72, and, in an embodiment, about 1.69 to about 1.72, and an nx of about 1.45 to about 1.55. Here, |nx−ny| may be in a range from about 0.1 to about 0.2, and, in an embodiment, about 0.12 to about 0.18. Within this range, the base layer 310 can further improve viewing angle of the polarizing plate 10 and can prevent or substantially prevent generation of rainbow spots.

In an embodiment, the base layer 310 may have a thickness of about 10 µm to about 200 µm, for example, about 20 µm to about 100 µm. Within this range, the base layer 310 can be used in the polarizing plate 10. Although the base layer 310 has an index of refraction of 1.60 or more and has a much higher thickness than the high refractivity layer 320 and the low refractivity layer 330 of the anti-reflection film 300A, the index of refraction of the bonding layer 200 of the polarizing plate 10 may be about 1.51 to less than about 1.60 while satisfying Relation 1, thereby reducing the reflectivity of the polarizing plate 10 to about 0.4% or less.

The high refractivity layer 320 is formed on the base layer 310 to improve hardness of the anti-reflection film 300A while reducing reflectivity of the anti-reflection film 300A together with the low refractivity layer 330. The high refractivity layer 320 may be composed of a single layer or at least two layers having different indices of refraction.

The high refractivity layer 320 has a higher index of refraction than the low refractivity layer 330. The high refractivity layer 320 may have an index of refraction of about 1.65 or more, for example, about 1.65 to about 1.80, for example, about 1.70 to about 1.80. Within this range, the high refractivity layer 320 can reduce reflectivity of the anti-reflection film 300A when the low refractivity layer 330 is stacked thereon.

The high refractivity layer 320 may have a thickness of about 0.05 µm to about 0.5 µm, and, in an embodiment, about 0.05 µm to about 0.3 µm, and, in an embodiment, about 0.1 µm to about 0.2 µm. Within this range, the high refractivity layer 320 can be used in the anti-reflection film 300A and can secure hardness of the anti-reflection film 300A.

The high refractivity layer 320 may be formed of a high refractivity layer composition capable of providing an index of refraction of about 1.65 or more after being cured.

In an embodiment, the high refractivity layer composition may include a high refractivity compound, a UV-curable compound having a lower index of refraction than the high refractivity compound, an initiator, and inorganic particles.

In an embodiment, the high refractivity compound is a UV-curable compound, and may include at least one of fluorene, biphenyl, bisphenol, thiophenyl, thiobenzyl, phenyl sulfide, thionaphthalene-based high refractivity resins, and high refractivity monomers.

The UV-curable compound has a lower index of refraction than the high refractivity compound. However, the UV-curable compound forms a matrix of the high refractivity layer 320 and can improve hardness of the high refractivity layer 320. A composition consisting of the high refractivity compound reduces hardness of the anti-reflection film 300A, thereby making it difficult to use the anti-reflection film 300A in an optical display. The UV-curable compound may be a compound having a UV-curable group, for example, a (meth)acrylate group or an epoxy group. The UV-curable compound may include at least one of a bi or higher functional (meth)acrylate monomer, an oligomer formed of the same, and a resin formed of the same. For example, the UV-curable compound may be a bi- to deca-functional (meth)acrylate compound.

The UV-curable compound may include at least one of a polyfunctional (meth)acrylate, such as an ester of a polyhydric alcohol and a (meth)acrylic acid, and a polyfunctional urethane (meth)acrylate prepared from a hydroxy ester of a polyhydric alcohol, an isocyanate compound, a hydroxy ester of a (meth)acrylic acid.

The UV-curable compound may include a bi- or higher functional (meth)acrylate compound. Examples of the bifunctional (meth)acrylate compound may include di(meth) acrylates, such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth) acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth) acrylate, hydroxy pivalate neopentyl glycol di(meth) acrylate, and the like. Examples of the tri- or higher functional (meth)acrylate compound may include tri(meth) acrylates, such as trimethylolpropane tri(meth)acrylate, ethoxylated trimethylolpropane tri(meth)acrylate, propoxylated trimethylolpropane tri(meth)acrylate; tris-2-hydroxyethylisocyanurate tri(meth)acrylate, and glycerin tri(meth) acrylate; trifunctional (meth)acrylate compounds, such as pentaerythritol tri(meth)acrylate, dipentaerythritol tri(meth) acrylate, ditrimethylolpropane tri(meth)acrylate; tri- or higher polyfunctional (meth)acrylate compounds, such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, ditrimethylolpropane hexa(meth)acrylate; and polyfunctional (meth)acrylate compounds obtained by substitution of some of these (meth)acrylates with ε-caprolactone.

The initiator forms the high refractivity layer 320 by curing the high refractivity compound and the UV-curable compound. The initiator may include at least one of typical photo-radical initiators and photo cationic initiators known to those skilled in the art. The initiator may have an absorption wavelength of about 400 nm or less to allow formation of the high refractivity layer 320 through photo-curing alone, but is not limited thereto.

The photo-radical initiator promotes curing through generation of radicals by light radiation and may include at least one of phosphorus, triazine, acetophenone, benzophenone, thioxanthone, benzoin, oxime, and phenyl ketone compounds. The photocationic initiator may include salts of cations and anions. Examples of the cations may include diaryliodonium, such as diphenyliodonium, 4-methoxydiphenyliodonium, bis(4-methylphenyl)iodonium, (4-methylphenyl)[(4-(2-methylpropyl)phenyl]iodonium, bis(4-tert-butylphenyl)iodonium, and bis(dodecylphenyl)iodonium; triarylsulfonium, such as triphenylsulfonium and diphenyl-4-thiophenoxyphenylsulfonium; bis[4-(diphenylsulfonio) phenyl]sulfide, bis[4-(di(4-(2-hydroxyethyl)phenyl)sulfonio)-phenyl]sulfide, ($\eta$5-2,4-cyclopentadiene-1-il)[(1,2,3,4,5,6-$\eta$)-(1-methylethyl)benzene]iron(1+), and the like. Examples of the anions may include tetrafluoroborate hexafluorophosphate ($BF_4^-$), hexafluoroantimonate ($SbF_6^-$), hexafluoroarsenate ($AsF_6^-$), hexachloroantimonate ($SbCl_6^-$), and the like.

The inorganic particles can increase the index of refraction and hardness of the high refractivity layer 320. The inorganic particles may not be subjected to surface treatment or may be subjected to surface treatment (for example, a compound containing a (meth)acrylate group) to improve compatibility with other components of the composition while improving hardness of the high refractivity layer 320. Surface treatment may be performed with respect to about 5% to about 50% of the total surface area of the inorganic particles. Within this range, the inorganic particles can increase hardness of the high refractivity layer 320 through coupling with the UV-curable compound and the high refractivity resin. The inorganic particles may include at least one of zirconia, titania, and alumina, and, in an exemplary embodiment, zirconia. In an embodiment, the inorganic particles may have an average particle diameter D50 of about 1 nm to about 50 nm, and, in an embodiment, about 5 nm to about 20 nm. Within this range of the particle diameter, the high refractivity layer composition can increase hardness of the anti-reflection film 300A without deterioration in optical properties thereof.

The high refractivity layer composition may further include typical additives well known to those skilled in the art. For example, the high refractivity layer composition may further include any of a defoamer, an antioxidant, a UV absorbent, a photostabilizer, a leveling agent, and an antistatic agent, without being limited thereto. The high refractivity layer composition may further include a solvent to further improve coatability of the high refractivity layer composition. In an embodiment, the solvent may include at least one of propylene glycol ether, and methylethylketone.

The low refractivity layer 330 may be formed on the high refractivity layer 320 and has a lower index of refraction than the high refractivity layer 320 to reduce reflectivity of the anti-reflection film 300A. In an embodiment, a difference in index of refraction between the high refractivity layer 320 and the low refractivity layer 330 (index of refraction of high refractivity layer−index of refraction of low refractivity layer) may be about 0.4 or more, for example, about 0.4 to about 1.0. Within this range, the polarizing plate 10 can reduce reflectivity of the anti-reflection film 300A while improving optical properties, such as haze and the like.

The low refractivity layer 330 may have an index of refraction of less than about 1.65, for example, about 1.5 or less, or, for example, about 1.1 to about 1.5. Within this range, the low refractivity layer 330 can reduce reflectivity of the anti-reflection film 300A.

The low refractivity layer 330 may have a thickness of about 0.01 μm to about 0.5 μm, and, in an embodiment, about 0.01 μm to about 0.3 μm. Within this thickness range, the low refractivity layer 330 can be used in the anti-reflection film 300A.

The low refractivity layer 330 may be formed of a low refractivity layer composition, which may have an index of refraction of less than about 1.65 after curing.

The low refractivity layer composition may include inorganic particles, a fluorine-containing monomer or an oligomer thereof, a fluorine-free monomer or an oligomer thereof, an initiator, and a fluorine-containing additive.

In an embodiment, the inorganic particles have a hollow structure to have a low index of refraction, thereby reducing the index of refraction of the low refractivity layer 330. The inorganic particles may have an index of refraction of about 1.4 or less, for example, about 1.2 to about 1.4. In an embodiment, the inorganic particles may be hollow silica particles. In an embodiment, the inorganic particles may be non-treated hollow particles not subjected to surface treatment or may be subjected to surface treatment with a UV-curable functional group. The inorganic particles may have the same or smaller average particle diameter D50 than the thickness of the low refractivity layer, and may have an average particle diameter D50 of about 30 nm to about 150 nm, for example, about 50 nm to about 100 nm. Within this range, the inorganic particles may be contained in the low refractivity layer 330 and can improve optical properties, such as haze and transmittance.

The fluorine-containing monomer or the oligomer thereof reduces the index of refraction of the low refractivity layer 330 together with the inorganic particles and forms a matrix of the low refractivity layer 330 together with the fluorine-free monomer or the oligomer thereof. The fluorine-containing monomer may include a fluorine-containing (meth)acrylate compound. The fluorine-containing monomer may include a typical compound well known to those skilled in the art.

The fluorine-free monomer or the oligomer thereof forms the matrix of the low refractivity layer 330 and may include a UV-curable compound. The fluorine-free monomer or the oligomer thereof may be a bi- or higher functional (meth)acrylate compound, for example, a bi- to deca-functional (meth)acrylate compound. In an embodiment, the fluorine-free monomer may include a polyfunctional (meth)acrylate, such as an ester of a polyhydric alcohol and a (meth)acrylic acid, as described above.

The initiator may be the same as or different from the initiator for the high refractivity layer composition.

In an embodiment, the additive imparts an anti-fouling function and slimness to the low refractivity layer 330 and may be selected from typical additives well known to those skilled in the art. The additive may include at least one of a fluorine-containing additive and a silicone based additive.

The low refractivity layer composition may further include a typical additive well known to those skilled in the art. For example, the low refractivity layer composition may further include any of a defoamer, an antioxidant, a UV absorbent, a photostabilizer, and a leveling agent, without being limited thereto.

The low refractivity layer composition may further include a solvent to further improve coatability of the low refractivity layer composition. In an embodiment, the solvent may include at least one of propylene glycol ether, methylethylketone, and ethylene glycol dimethyl ether.

The bonding layer 200 is directly formed on each of the polarizer 100 and the anti-reflection film 300A, particularly, on the base layer 310 of the anti-reflection film 300A to bond the polarizer 100 and the anti-reflection film 300A to each other. In the polarizing plate 10 according to the present invention, the bonding layer 200 bonds the polarizer 100 and the anti-reflection film 300A to each other and has an index of refraction about 1.51 to less than about 1.60 while satisfying Relation 1, thereby reducing reflectivity of the polarizing plate 10, despite the presence of the anti-reflection film 300A having relatively high reflectivity due to a higher index of refraction than the low refractivity layer of the base layer in the polarizing plate. In an exemplary embodiment, the bonding layer has an index of refraction of about 1.51 to about 1.59, for example, about 1.51 to about 1.55. For example, the bonding layer may have an index of refraction of about 1.51, 1.52, 1.53, 1.54, 1.55, 1.56, 1.57, 1.58, or 1.59.

The bonding layer 200 may be formed of a bonding layer composition, which has an index of refraction in the above range and satisfies Relation 1 after curing. The bonding layer composition may include an epoxy compound and an initiator. The bonding layer composition may further include at least one of a (meth)acrylate compound and an oxetane compound. The index of refraction of the bonding layer may be determined through adjustment of the kind and/or content of each component of the bonding layer composition, as well known to those skilled in the art.

The epoxy compound may include at least one of a linear aliphatic epoxy compound, an alicyclic epoxy compound, an aromatic epoxy compound, and a hydrogenated epoxy compound.

The linear aliphatic epoxy compound may be an aliphatic polyhydric alcohol or a polyglycidyl ether of alkylene oxide adducts thereof. For example, the linear aliphatic epoxy compound may include polyglycidyl ethers of polyether polyols obtained by adding at least one type of alkylene oxide to aliphatic polyhydric alcohols, such as neopentyl glycol diglycidyl ether, diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propylene glycol, ethylene glycol, and propylene glycol or glycerin.

The alicyclic epoxy compound may include at least one of 3,4-epoxycyclohexyl methyl 3,4-epoxycyclohexane carboxylate, 3,4-epoxy-6-methylcyclohexylmethyl 3,4-epoxy-6-methylcyclohexane carboxylate, ethylene bis(3,4-epoxycyclohexane carboxylate), bis(3,4-epoxy-6-methylcyclohexylmethyl)adipate, diethylene glycol bis(3,4-epoxycyclohexylmethylether), ethylene glycol bis(3,4-epoxycyclohexylmethylether), 2,3,14,15-diepoxy-7,11,18,21-tetraoxaspiro[5.2.2.5.2.2]heneicosanoic acid, 3-(3,4-epoxycyclohexyl)-8,9-epoxy-1,5-dioxaspiro[5.5]undecane, 4-vinylcycicohexane dioxide, limonene dioxide, bis(2,3-epoxycyclopentyl)ether, and dicyclopentadiene dioxide.

The aromatic epoxy compound may include at least one of bisphenol type epoxy resins, such as phenyl glycidyl ether, diglycidyl ether of bisphenol A, diglycidyl ether of bisphenol F, and diglycidyl ether of bisphenol S; novolac type epoxy resins, such as a phenol novolac epoxy resin, a cresol novolac epoxy resin, and a hydroxybenzaldehyde phenol novolac epoxy resin; and polyfunctional epoxy resins, such as glycidyl ether of tetrahydroxydiphenyl methane, glycidyl ether of tetrahydroxy benzophenone, and epoxylated polyvinyl phenol.

The hydrogenated epoxy compound is obtained by selective hydrogenation of the aromatic epoxy compound in the presence of a catalyst under pressure. Here, the aromatic epoxy compound may include, for example, bisphenol type epoxy resins, such as diglycidyl ether of bisphenol A, diglycidyl ether of bisphenol F, and diglycidyl ether of bisphenol S; novolac type epoxy resins, such as a phenol novolac epoxy resin, a cresol novolac epoxy resin, and a hydroxybenzaldehyde phenol novolac epoxy resin; and polyfunctional epoxy resins, such as glycidyl ether of tetrahydroxydiphenyl methane, glycidyl ether of tetrahydroxy benzophenone, and epoxylated polyvinyl phenol.

The initiator may include at least one of a photocationic initiator and a photo-radical initiator. These initiators may be used alone or as a mixture thereof.

The photocationic initiator may be selected from any typical photocationic initiators well known to those skilled in the art. In an embodiment, the photocationic initiator may include an onium salt containing a cation and an anion. Examples of the cation may include diaryliodonium, such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl]iodonium; triarylsulfonium, such as triphenylsulfonium and diphenyl-4-thiophenoxyphenylsulfonium; bis[4-(diphenylsulfonio)phenyl]sulfide, and the like. Examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and the like.

The photo-radical initiator may be selected from any typical photo-radical initiators well known to those skilled in the art. In an embodiment, the photo-radical initiator may include at least one of thioxanthone, phosphorus, triazine, acetophenone, benzophenone, benzoin, oxime, and phenyl ketone compounds.

The (meth)acrylate compound may include a (meth)acrylate compound having at least one (meth)acrylate group therein. The (meth)acrylate compound may include at least one of a (meth)acrylate compound having at least one hydrophilic group (for example: hydroxyl group) and a (meth)acrylate compound having no hydrophilic group, without being limited thereto.

The (meth)acrylate compound having at least one hydrophilic group may include at least one of 2-hydroxyethyl (meth)acrylate, 2- or 3-hydroxypropyl (meth)acrylate, 2-hydroxybutyl (meth)acrylate, 2-hydroxy-3-phenoxypropyl (meth)acrylate, and 4-hydroxybutyl (meth)acrylate, without being limited thereto.

The (meth)acrylate compound having no hydrophilic group may include at least one of isobutyl (meth)acrylate, t-butyl (meth)acrylate, 2-ethylhexyl (meth)acrylate, cyclohexyl (meth)acrylate, dicyclopentenyl (meth)acrylate, benzyl (meth)acrylate, isobornyl (meth)acrylate, phenoxy ethyl (meth)acrylate, (dicyclopentanyl oxy)ethyl (meth)acrylate, and (dimethyl amino) ethyl (meth)acrylate, without being limited thereto.

The oxetane compound may include at least one of 3,7-bis(3-oxetanyl)-5-oxa-nonane, 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, triethylene glycol bis(3-ethyl-3-oxetanylmethyl)ether, tetra-ethylene glycol bis(3-ethyl-3-oxetanylmethyl)ether, 1,4-bis(3-ethyl-3-oxetanyl methoxy)butane, 1,6-bis(3-ethyl-3-oxetanylmethoxy)hexane, 3-ethyl-3-[(phenoxy)methyl]oxetane, 3-ethyl-3-(hexyloxymethyl)oxetane, 3-ethyl-3-(2-ethylhexyloxymethyl)oxetane, 3-ethyl-3-(hydroxymethyl)oxetane, 3-ethyl-3-(chlormethyl)oxetane, and (3-ethyl-3[[(3-ethyloxetane-3-yl)methoxy]methyl]oxetane, without being limited thereto.

In an embodiment, the bonding layer composition may include about 50 wt % to about 80 wt % of the epoxy compound; about 10 wt % to about 40 wt % of at least one of the (meth)acrylate compound and the oxetane compound; and about 1 wt % to about 10 wt % of the initiator in terms of solid content. Within this range, the bonding layer composition can secure bonding strength and the index of refraction according to the present invention.

In another embodiment, the bonding layer composition may include about 50 wt % to about 80 wt % of the alicyclic epoxy compound, about 1 wt % to about 20 wt % of the aromatic epoxy compound, about 1 wt % to about 20 wt % of the (meth)acrylate compound having at least one hydrophilic group, about 1 wt % to about 20 wt % of the (meth)acrylate compound having no hydrophilic group, and about 1 wt % to about 10 wt % of the initiator in terms of solid content. Within this range, the bonding layer composition can secure bonding strength and the index of refraction according to the present invention.

In another embodiment, the bonding layer composition may include about 30 wt % to about 70 wt % of the aromatic epoxy compound, about 10 wt % to about 50 wt % of the linear aliphatic epoxy compound, about 10 wt % to about 40 wt % of the oxetane compound, and about 1 wt % to about 10 wt % of the initiator in terms of solid content. Within this range, the bonding layer composition can secure bonding strength and the index of refraction according to the present invention.

In another embodiment, the bonding layer composition may include at least one of the epoxy compounds, the (meth)acrylate compound, and the oxetane compound, in which the aromatic epoxy compound may be present in an amount of about 10 wt % to about 50 wt %, for example, about 15 wt % to about 45 wt %, in the bonding layer composition. Within this range, the bonding layer composition can secure bonding strength and the index of refraction according to the present invention.

The bonding layer 200 may have a thickness of about 1 μm to about 10 μm, and, in an embodiment, about 1 μm to about 5 μm. Within this thickness range, the bonding layer 200 can be used in the polarizing plate 10 and can improve reliability through improvement of bonding properties.

The polarizer 100 is formed on an upper surface of a polarizer protective film 400 to polarize and transmit light received through the polarizer protective film 400.

The polarizer 100 may have an index of refraction of less than about 1.51, for example, about 1.5 or less, and, in an embodiment, about 1.3 to about 1.5. Within this range, the polarizer 100 has a suitable index of refraction as compared with those of the bonding layer 200 and the base layer 310, thereby reducing reflectivity of the polarizing plate 10 to about 0.4% or less.

The polarizer 100 may include a polarizer prepared from a polyvinyl alcohol film. The polarizer 100 may include a polyvinyl alcohol film dyed with iodine or a polyene-based polarizer obtained through dehydration of the polyvinyl alcohol film. The index of refraction of the polarizer 100 may be obtained by adjusting the weight average molecular weight of a polyvinyl alcohol resin constituting the polyvinyl alcohol film, the content of iodine in preparation of the polarizer 100, and the like.

The polarizer 100 may have a thickness of about 5 μm to about 50 μm, and, in an embodiment, about 10 μm to about 30 μm. Within this range, the polarizer 100 can be used in an optical display.

The polarizer protective film 400 is formed on a lower surface of the polarizer 100 to support the polarizer 100 while providing additional optical functions to the polarizing plate 10.

The polarizer protective film 400 may include a film formed of an optically transparent resin. The protective film may be formed through melting and extrusion of the resin. The protective film may be further subjected to stretching, as needed. The optically transparent resin may include at least one selected from cellulose ester resins including triacetylcellulose, cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, polyacrylate resins including poly(methyl methacrylate), polyvinyl alcohol resins, polyvinyl chloride resins, and polyvinylidene chloride resins.

In an embodiment, the polarizer protective film 400 may have a thickness of about 10 μm to about 200 μm, for example, about 20 μm to about 100 μm. Within this thickness range, the polarizer protective film 400 can be used in the polarizing plate 10.

Although not shown in FIG. 1, in an embodiment, an adhesive layer may be formed on a lower surface of the polarizer protective film 400 to attach the polarizing plate 10 to an adherend. The adhesive layer may be formed of a typical pressure sensitive adhesive, without being limited thereto. Further, although not shown in FIG. 1, the polarizer 100 may be stacked on the polarizer protective film 400 via a typical bonding layer.

Next, a polarizing plate according to another embodiment of the present invention will be described with reference to FIG. 2.

Figure 2:
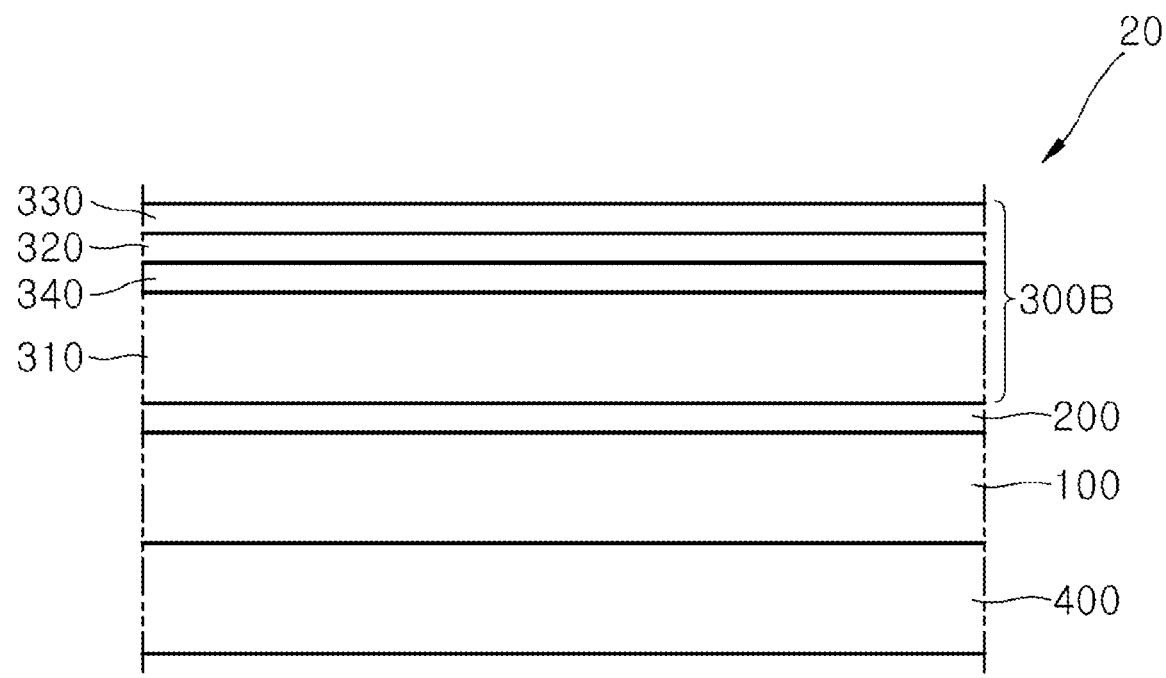
FIG. 2 is a cross-sectional view of a polarizing plate according to another embodiment of the present invention.

Referring to FIG. 2, a polarizing plate 20 according to another embodiment is substantially the same as the polarizing plate 10 according to the above-described embodiment except that the polarizing plate 20 includes a bonding layer 200 and an anti-reflection film 300B sequentially formed on an upper surface of the polarizer 100, and the anti-reflection film 300B includes a base layer 310, a hard coating layer 340, a high refractivity layer 320, and a low refractivity layer 330 sequentially stacked on the bonding layer 200. The hard coating layer 340 is further formed between the base layer 310 and the high refractivity layer 320.

The anti-reflection film 300B may have a reflectivity of about 0.3% or less, for example, about 0.15% to about 0.25%.

The hard coating layer 340 is directly formed on an upper surface of the base layer 310 and provides a hard coating function to the base layer 310. In the polarizing plate 20 according to embodiments of the present invention, the base layer 310 has a much higher index of refraction than each of the low refractivity layer 320 and the hard coating layer 340. A difference in index of refraction between the base layer 310 and the low refractivity layer 320 may be about 0.25 or more, for example, about 0.25 to about 0.5, and a difference in index of refraction between the base layer 310 and the hard coating layer 340 may be about 0.05 or more, for example, about 0.05 to about 0.2. According to embodiments of the present invention, the bonding layer 200 has an index of refraction of about 1.51 to less than about 1.60 and the indices of refraction of the polarizer 100, the bonding layer 200, and the base layer 310 are set to satisfy Relation 1, thereby reducing reflectivity of the polarizing plate to about 0.4% or less, as measured at a side of the low refractivity layer 330 thereof.

The hard coating layer 340 may have an index of refraction of about 1.50 to less than about 1.60, for example, about 1.50 to about 1.599. Within this range, the reflectivity of the polarizing plate 20 can be reduced to about 0.4% or less through adjustment of the indices of refraction of the bonding layer 200, the base layer 310, the high refractivity layer 320, and the low refractivity layer 330.

The hard coating layer 340 may be formed of a resin, such as a polyurethane resin, a urethane (meth)acrylate resin, an epoxy resin, a silicone resin, and the like, without being limited thereto.

In an embodiment, the hard coating layer 340 has a thickness of about 3 μm to about 20 μm, for example, about 5 μm to about 15 μm. Within this range, the hard coating layer 340 can be used in the polarizing plate 20.

Next, a polarizing plate according to another embodiment of the present invention will be described with reference to FIG. 3.

Figure 3:
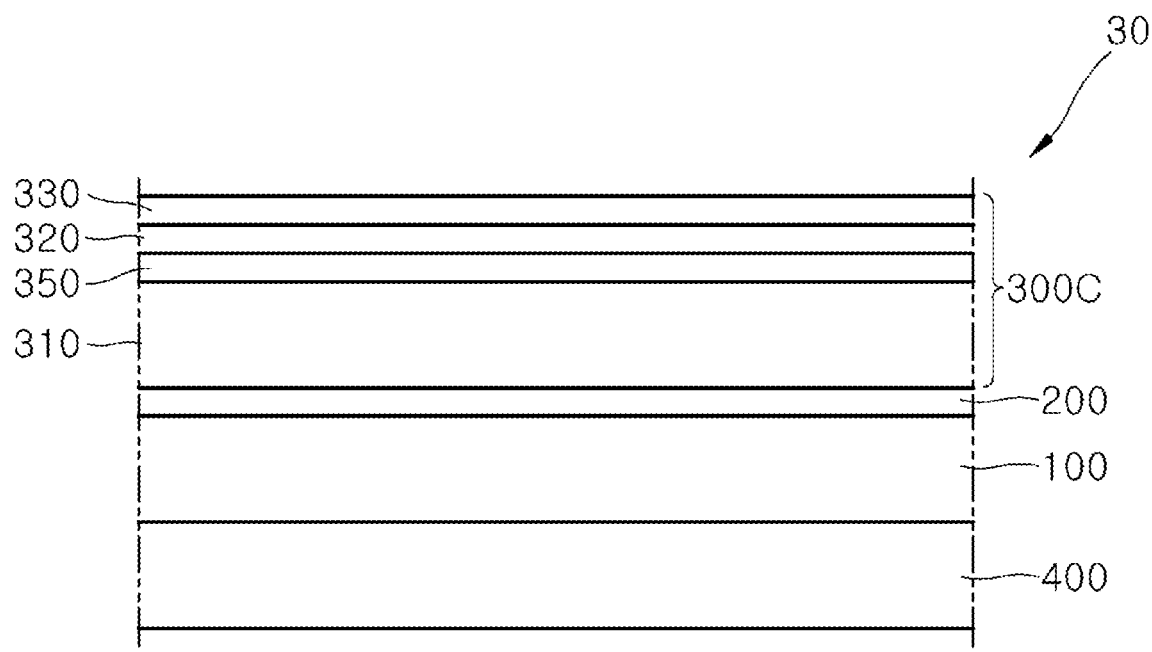
FIG. 3 is a cross-sectional view of a polarizing plate according to another embodiment of the present invention.

Referring to FIG. 3, a polarizing plate 30 according to another embodiment is substantially the same as the polarizing plate 10 according to the above-described embodiment except that the polarizing plate 30 includes a bonding layer 200 and an anti-reflection film 300C sequentially formed on an upper surface of the polarizer 100, and the anti-reflection film 300C includes a base layer 310, a support layer 350, a high refractivity layer 320, and a low refractivity layer 330 sequentially stacked on the bonding layer 200. The support layer 350 is further formed between the base layer 310 and the high refractivity layer 320.

The support layer 350 is formed between the base layer 310 and the high refractivity layer 320 to improve mechanical strength of the anti-reflection film 300C. In addition, in the structure wherein a base layer of the anti-reflection film 300C is formed of a non-stretched film or an isotropic optical film, a phase retardation film is used as the support layer 350 to provide additional functions to the polarizing plate 30.

In an embodiment, the support layer 350 may have an index of refraction of about 1.50 to less than about 1.60, for example, about 1.50 to about 1.599. Within this range, the reflectivity of the polarizing plate 30 can be reduced to about 0.4% or less through adjustment of the indices of refraction of the bonding layer 200, the base layer 310, the high refractivity layer 320, and the low refractivity layer 330.

In an embodiment, the support layer 350 may be formed of a different resin than the resin for the base layer described above. The support layer 350 may have the same thickness as or a different thickness than the base layer described above. The support layer may have the same retardation or a different retardation than the base layer described above. In an exemplary embodiment, the support layer may have an in-plane retardation Re of about 8,000 nm or more, and, in an embodiment, about 10,000 nm or more, and, in an embodiment, more than about 10,000 nm, and, in an embodiment, about 10,100 nm to about 15,000 nm, at a wavelength of 550 nm.

The support layer 350 may be directly formed on the base layer 310. Although not shown in FIG. 3, in an embodiment, the support layer 350 may be formed on the base layer 310 via an adhesive layer of a bonding layer.

An optical display according to the present invention may include the polarizing plate according to the present invention. The optical display may include any of a liquid crystal display, a light emitting diode display, and the like. In an embodiment, the polarizing plate according to the present invention may be used at a viewer side polarizing plate in a liquid crystal display.

Next, the present invention will be described in more detail with reference to some examples. However, it should be noted that these examples are provided for purposes of illustration and are not to be construed in any way as limiting the present invention.

Example 1

A polarizer (thickness: 22 μm, index of refraction: 1.5) was prepared by stretching a polyvinyl alcohol film (PS60, Kuraray Co., Ltd.) to three times an initial length thereof at 60° C., dyeing the stretched film with iodine, and stretching the dyed film to 2.5 times the length of the stretched film in a boric acid solution at 40° C.

An anti-reflection film was a DSG-17(Z)PET film (DAI Nippon Printing Co., Ltd.) (reflectivity: 0.2%) in which a hard coating layer, a high refractivity layer, and a low refractivity layer were sequentially stacked on one surface of a polyethylene terephthalate (PET) film. In the DSG-17(Z) PET film, the PET film was a uniaxially stretched film having an MD index of refraction of 1.60 and a TD index of refraction of 1.72, and had a thickness of 80 μm. In the DSG-17(Z)PET film, the hard coating layer had an index of refraction of 1.54 and a thickness of 8 μm; the high refractivity layer had an index of refraction of 1.72 and a thickness of 0.15 μm, and contained zirconia. In the DSG-17(Z)PET film, the low refractivity layer had an index of refraction of 1.29 and a thickness of 0.1 μm and contained hollow silica.

A bonding layer was formed by depositing a bonding agent (HE-82MS, Samwon Co., Ltd.) to a predetermined thickness on the PET film surface of the DSG-17(Z)PET film (DAI Nippon Printing Co., Ltd.), which in turn was bonded to one surface of the prepared polarizer via the bonding agent. The bonding agent (HE-82MS, Samwon Co., Ltd.) contained 70 wt % of 3,4-epoxycyclohexylmethyl-3,4-epoxycyclohexanecarboxylate, 9 wt % of phenyl glycidyl ether, 10 wt % of 4-hydroxybutyl acrylate, 10 wt % of phenoxy ethyl acrylate, and 1 wt % of an initiator (diethyl thioxanthone).

Another bonding layer was formed by depositing a bonding agent (HE-82MS, Samwon Co., Ltd.) to a predetermined thickness on one surface of a cycloolefin (COP) film (ZB series, index of refraction: 1.53, Zeon Co., Ltd.), which in turn was bonded to the other surface of the prepared polarizer via the bonding agent. Then, the resulting product was irradiated with UV light to cure the bonding layers, thereby preparing a polarizing plate. Each of the bonding layers had a thickness of 3 μm.

Example 2

A polarizing plate was prepared in the same manner as in Example 1 except that KRX-4024 (ADEKA Co., Ltd.) was used instead of HE-82MS (Samwon Co., Ltd.). KRX-4024 (ADEKA Co., Ltd.) contained 40 wt % of bisphenol A diglycidyl ether, 30 wt % of neopentyl glycol diglycidyl ether, 23 wt % of (3-ethyl-3[[(3-ethyloxetane-3-yl)methoxy] methyl]oxetane), and 7 wt % of the initiator.

Example 3

A polarizing plate was prepared in the same manner as in Example 1 except that bonding layers having an index of refraction as shown in Table 1 were formed using a composition obtained through adjustment of the contents of 3,4-epoxycyclohexyl methyl-3,4-epoxycyclohexanecarboxylate, phenyl glycidyl ether, 4-hydroxybutyl acrylate, phenoxy ethyl acrylate, and the initiator, instead of HE-82MS (Samwon Co., Ltd.).

Comparative Example 1

A polarizing plate was prepared in the same manner as in Example 1 except that UV-2G (Samwon Co., Ltd.) was used instead of HE-82MS (Samwon Co., Ltd.). UV-2G (Samwon Co., Ltd.) contained 77 wt % of 3,4-epoxycyclohexanemethyl-3,4-epoxycyclohexyl carboxylate, 16 wt % of dipropylene glycol diacrylate, 5 wt % of phenyl glycidyl ether, and 2 wt % of an initiator (1-hydroxy-cyclohexylphenylketone).

Comparative Example 2

A polarizing plate was prepared in the same manner as in Example 1 except that bonding layers having an index of refraction as shown in Table 1 were formed using a composition obtained through adjustment of the contents of 3,4-epoxycyclohexyl methyl-3,4-epoxycyclohexanecarboxylate, phenyl glycidyl ether, 4-hydroxybutyl acrylate, phenoxy ethyl acrylate, and the initiator, instead of HE-82MS (Samwon Co., Ltd.).

Comparative Example 3

A polarizing plate was prepared in the same manner as in Example 1 except that bonding layers having an index of refraction as shown in Table 1 were formed using a composition obtained through adjustment of the contents of 3,4-epoxycyclohexyl methyl-3,4-epoxycyclohexanecarboxylate, phenyl glycidyl ether, 4-hydroxybutyl acrylate, phenoxy ethyl acrylate, and the initiator, instead of HE-82MS (Samwon Co., Ltd.).

Specimens were prepared by depositing an adhesive (ZB12 series, Zeon Co., Ltd.) on one surface of the COP film of each of the polarizing plates prepared in the Examples and Comparative Examples, followed by laminating a black acryl plate (PH10 Acryl plate). Reflectivity of each specimen was measured at a wavelength of 550 nm in an SCU reflection mode (light source: C light source, light source diameter φ: 4 mm, measurement viewing angle: 2°, SAV) using a spectrophotometer (Spectrophotometer, Konica Minolta Co., Ltd., CM-3700A).

TABLE 1

| Item | Example 1 | Example 2 | Example 3 | Comparative Example 1 | Comparative Example 2 | Comparative Example 3 |
|---|---|---|---|---|---|---|
| Index of refraction of low refractivity layer | 1.29 | 1.29 | 1.29 | 1.29 | 1.29 | 1.29 |

TABLE 1-continued

| Item | Example 1 | Example 2 | Example 3 | Comparative Example 1 | Comparative Example 2 | Comparative Example 3 |
|---|---|---|---|---|---|---|
| Index of refraction of high refractivity layer | 1.72 | 1.72 | 1.72 | 1.72 | 1.72 | 1.72 |
| Index of refraction of hard coating layer | 1.54 | 1.54 | 1.54 | 1.54 | 1.54 | 1.54 |
| Index of refraction of base layer | 1.60 | 1.60 | 1.60 | 1.60 | 1.60 | 1.60 |
| Index of refraction of bonding layer | 1.541 | 1.530 | 1.55 | 1.505 | 1.61 | 1.47 |
| Index of refraction of polarizer | 1.5 | 1.5 | 1.5 | 1.5 | 1.5 | 1.5 |
| Reflectivity (%) | 0.34 | 0.36 | 0.32 | 0.42 | 0.45 | 0.5 |

As shown in Table 1, the polarizing plates according to the present invention could reduce reflectivity to 0.4% or less even with an anti-reflection film including a base layer having a high index of refraction.

On the contrary, the polarizing plate of Comparative Example 1, which failed to satisfy Relation 1, and the polarizing plates of Comparative Examples 2 and 3, which failed to satisfy Relation 1 and the index of refraction of the bonding layer, had a reflectivity of greater than 0.4%.

While some embodiments of the present invention have been described herein, it is to be understood that various modifications, changes, alterations, and equivalent embodiments can be made by those skilled in the art without departing from the spirit and scope of the invention.

What is claimed is:

1. A polarizing plate comprising:
a polarizer;
a bonding layer on an upper surface of the polarizer; and
an anti-reflection film on an upper surface of the bonding layer,
wherein the anti-reflection film comprises a base layer, a high refractivity layer, and a low refractivity layer sequentially stacked on the bonding layer in the stated order,
the bonding layer having an index of refraction of about 1.51 to less than 1.60, and
the polarizer, the bonding layer, and the base layer satisfying the following Relation 1:

Index of refraction of polarizer<Index of refraction of bonding layer<Index of refraction of base layer.

2. The polarizing plate according to claim 1, wherein the anti-reflection film has a reflectivity of about 0.3% or less.

3. The polarizing plate according to claim 1, wherein the base layer has a higher index of refraction than the low refractivity layer, and a difference in index of refraction between the base layer and the low refractivity layer is about 0.25 or more.

4. The polarizing plate according to claim 1, wherein the base layer has an index of refraction of about 1.60 or more.

5. The polarizing plate according to claim 1, wherein the base layer comprises a film formed of at least one of polyethylene terephthalate, polybutylene terephthalate, polyethylene naphthalate, and polybutylene naphthalate.

6. The polarizing plate according to claim 1, wherein the high refractivity layer has an index of refraction of about 1.65 or more.

7. The polarizing plate according to claim 1, wherein the low refractivity layer has an index of refraction of less than about 1.65.

8. The polarizing plate according to claim 1, wherein the bonding layer is formed of a bonding layer composition comprising an epoxy compound and an initiator.

9. The polarizing plate according to claim 8, wherein the bonding layer composition further comprises at least one of a (meth)acrylate compound and an oxetane compound.

10. The polarizing plate according to claim 1, wherein the bonding layer is formed of a bonding layer composition comprising about 50 wt % to about 80 wt % of an alicyclic epoxy compound, about 1 wt % to about 20 wt % of an aromatic epoxy compound, about 1 wt % to about 20 wt % of a (meth)acrylate compound having at least one hydrophilic group, about 1 wt % to about 20 wt % of a (meth)acrylate compound having no hydrophilic group, and about 1 wt % to about 10 wt % of an initiator in terms of solid content.

11. The polarizing plate according to claim 1, wherein the bonding layer is formed of a bonding layer composition comprising about 30 wt % to about 70 wt % of an aromatic epoxy compound, about 10 wt % to about 50 wt % of a linear aliphatic epoxy compound, about 10 wt % to about 40 wt % of an oxetane compound, and about 1 wt % to about 10 wt % of an initiator in terms of solid content.

12. The polarizing plate according to claim 1, wherein the polarizer has an index of refraction of about 1.3 to about 1.5, the bonding layer has an index of refraction of about 1.51 to about 1.59, the base layer has an index of refraction of about 1.60 to about 1.75, the high refractivity layer has an index of refraction of about 1.65 to about 1.80, and the low refractivity layer has an index of refraction of about 1.1 to about 1.5.

13. The polarizing plate according to claim 1, wherein the anti-reflection film further comprises a hard coating layer between the base layer and the high refractivity layer.

14. The polarizing plate according to claim 13, wherein the anti-reflection film has a reflectivity of about 0.3% or less.

15. The polarizing plate according to claim 13, wherein the base layer has a higher index of refraction than the hard coating layer, and a difference in index of refraction between the base layer and the hard coating layer is about 0.05 or more.

16. The polarizing plate according to claim 13, wherein the polarizer has an index of refraction of about 1.3 to about 1.5, the bonding layer has an index of refraction of about 1.51 to about 1.59, the base layer has an index of refraction of about 1.60 to about 1.75, the hard coating layer has an index of refraction of about 1.50 to about 1.599, the high refractivity layer has an index of refraction of about 1.65 to about 1.80, and the low refractivity layer has an index of refraction of about 1.1 to about 1.5.

17. The polarizing plate according to claim 1, wherein the anti-reflection film further comprises a support layer between the base layer and the high refractivity layer.

18. The polarizing plate according to claim 1, further comprising a polarizer protective film on a lower surface of the polarizer.

19. The polarizing plate according to claim 1, wherein the polarizing plate has a reflectivity of about 0.4% or less, as measured at a side of the low refractivity layer.

20. An optical display comprising the polarizing plate according to claim 1.

* * * * *